US012183173B2

(12) United States Patent
Ouellette et al.

(10) Patent No.: US 12,183,173 B2
(45) Date of Patent: Dec. 31, 2024

(54) SYSTEMS AND METHODS FOR PROVIDING PERSONALIZED AND CONTEXTUALIZED ENVIRONMENT SECURITY INFORMATION IN A REMEDIATION CONVERSATION

(71) Applicant: Johnson Controls Tyco IP Holdings LLP, Milwaukee, WI (US)

(72) Inventors: Jason M. Ouellette, Sterling, MA (US); Gopal Paripally, North Andover, MA (US); Kapang Lam, Chelmsford, MA (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 225 days.

(21) Appl. No.: 17/851,987

(22) Filed: Jun. 28, 2022

(65) Prior Publication Data

US 2023/0011396 A1    Jan. 12, 2023

Related U.S. Application Data

(60) Provisional application No. 63/218,839, filed on Jul. 6, 2021.

(51) Int. Cl.
*G08B 21/00* (2006.01)
*G06F 3/0484* (2022.01)
(Continued)

(52) U.S. Cl.
CPC ......... *G08B 13/196* (2013.01); *G06F 3/0484* (2013.01); *G06F 3/167* (2013.01); *G06V 20/52* (2022.01)

(58) Field of Classification Search
CPC ............ G08B 13/196; G08B 13/19682; G06F 3/0484; G06F 3/167; G06V 20/52;
(Continued)

(56) References Cited

U.S. PATENT DOCUMENTS

| 2012/0159650 A1 | 6/2012 | Cho et al. |
| 2012/0224057 A1 | 9/2012 | Gill et al. |

(Continued)

FOREIGN PATENT DOCUMENTS

| WO | WO-2006101472 A1 * | 9/2006 | ............. G08B 13/00 |
| WO | WO-2016173865 A1 * | 11/2016 | ............. G06Q 10/10 |

OTHER PUBLICATIONS

International Search Report and Written Opinion in PCT/IB2022/000393, mailed Oct. 12, 2022, 15 pages.

*Primary Examiner* — Mark S Rushing
(74) *Attorney, Agent, or Firm* — ArentFox Schiff LLP

(57) ABSTRACT

Disclosed herein are apparatuses and methods for providing personalized and contextualized environment security information. An implementation may comprise collecting a plurality of sensor data from a plurality of sensors located in an environment, detecting a security event in the environment based on at least a portion of the plurality of sensor data, and generating contextual information for the security event based on at least a larger portion of the plurality of sensor data. The implementation may further comprise detecting a first user accessing security information for the environment on an output device, retrieving a user profile of the first user, and generating a remediation conversation based on the user profile, the security event, and the contextual information. The implementation may further comprise outputting at least a first portion of the remediation conversation on the output device.

20 Claims, 9 Drawing Sheets

(51) Int. Cl.
*G06F 3/16* (2006.01)
*G08B 13/196* (2006.01)
*G06V 20/52* (2022.01)

(58) Field of Classification Search
CPC ......... H04L 41/16; H04L 63/08; H04L 41/22; G07C 9/28
USPC ....................................................... 340/541
See application file for complete search history.

(56) References Cited

U.S. PATENT DOCUMENTS

| | | | |
|---|---|---|---|
| 2016/0189509 A1* | 6/2016 | Malhotra | G08B 25/009 340/541 |
| 2016/0219078 A1* | 7/2016 | Porras | H04L 41/22 |
| 2019/0319987 A1* | 10/2019 | Levy | G06N 5/046 |
| 2019/0324780 A1* | 10/2019 | Zhu | G06N 3/045 |
| 2020/0162489 A1* | 5/2020 | Bar-Nahum | G06N 20/00 |

* cited by examiner

SYSTEMS AND METHODS FOR PROVIDING PERSONALIZED AND CONTEXTUALIZED ENVIRONMENT SECURITY INFORMATION IN A REMEDIATION CONVERSATION

CROSS-REFERENCE TO RELATED APPLICATIONS

The application claims the benefit of U.S. Provisional Application No. 63/218,839, filed Jul. 6, 2021, which is herein incorporated by reference.

TECHNICAL FIELD

The described aspects relate to security systems.

BACKGROUND

Aspects of the present disclosure relate generally to security systems, and more particularly, to providing personalized and contextualized environment security information.

Modern security systems typically offer limited smart features. For example, a security system may have multiple sensors distributed around an environment and may be able to detect anomalies in sensor data, but only report on the disparate detected anomalies. This leaves the burden of deduction on the security personnel, which is especially time inefficient in emergencies.

Modern security systems also include only generalized user interfaces. If information is generically presented, certain details may be missed by security personnel and this places them at a disadvantage when addressing security issues.

Accordingly, there exists a need for improvements in security systems.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

An example implementation includes a method for providing personalized and contextualized environment security information, comprising collecting a plurality of sensor data from a plurality of sensors located in an environment. The method further includes detecting a security event in the environment based on at least a portion of the plurality of sensor data. The method further includes generating contextual information for the security event based on at least a larger portion of the plurality of sensor data. The method further includes detecting a first user accessing security information for the environment on an output device. The method further includes retrieving a user profile of the first user, wherein the user profile is indicative of access rights and user interface preferences. The method further includes generating a remediation conversation based on the user profile, the security event, and the contextual information, wherein the remediation conversation comprises dialogue for providing security information and guiding the first user to resolve the security event. The method further includes outputting at least a first portion of the remediation conversation on the output device.

Another example implementation includes an apparatus for providing personalized and contextualized environment security information, comprising a memory and a processor in communication with the memory. The processor is configured to collect a plurality of sensor data from a plurality of sensors located in an environment. The processor is configured to detect a security event in the environment based on at least a portion of the plurality of sensor data. The processor is configured to generate contextual information for the security event based on at least a larger portion of the plurality of sensor data. The processor is configured to detect a first user accessing security information for the environment on an output device. The processor is configured to retrieve a user profile of the first user, wherein the user profile is indicative of access rights and user interface preferences. The processor is configured to generate a remediation conversation based on the user profile, the security event, and the contextual information, wherein the remediation conversation comprises dialogue for providing security information and guiding the first user to resolve the security event. The processor is configured to output at least a first portion of the remediation conversation on the output device.

Another example implementation includes an apparatus for providing personalized and contextualized environment security information, comprising means for collecting a plurality of sensor data from a plurality of sensors located in an environment. The apparatus further includes means for detecting a security event in the environment based on at least a portion of the plurality of sensor data. The apparatus further includes means for generating contextual information for the security event based on at least a larger portion of the plurality of sensor data. The apparatus further includes means for detecting a first user accessing security information for the environment on an output device. The apparatus further includes means for retrieving a user profile of the first user, wherein the user profile is indicative of access rights and user interface preferences. The apparatus further includes means for generating a remediation conversation based on the user profile, the security event, and the contextual information, wherein the remediation conversation comprises dialogue for providing security information and guiding the first user to resolve the security event. The apparatus further includes means for outputting at least a first portion of the remediation conversation on the output device.

Another example implementation includes a computer-readable medium for providing personalized and contextualized environment security information, executable by a processor to collect a plurality of sensor data from a plurality of sensors located in an environment. The instructions are further executable to detect a security event in the environment based on at least a portion of the plurality of sensor data. The instructions are further executable to generate contextual information for the security event based on at least a larger portion of the plurality of sensor data. The instructions are further executable to detect a first user accessing security information for the environment on an output device. The instructions are further executable to retrieve a user profile of the first user, wherein the user profile is indicative of access rights and user interface preferences. The instructions are further executable to generate a remediation conversation based on the user profile, the security event, and the contextual information, wherein the remediation conversation comprises dialogue for providing security information and guiding the first user to resolve the security event. The instructions are further executable to output at least a first portion of the remediation conversation on the output device.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

DETAILED DESCRIPTION

Figure 1:
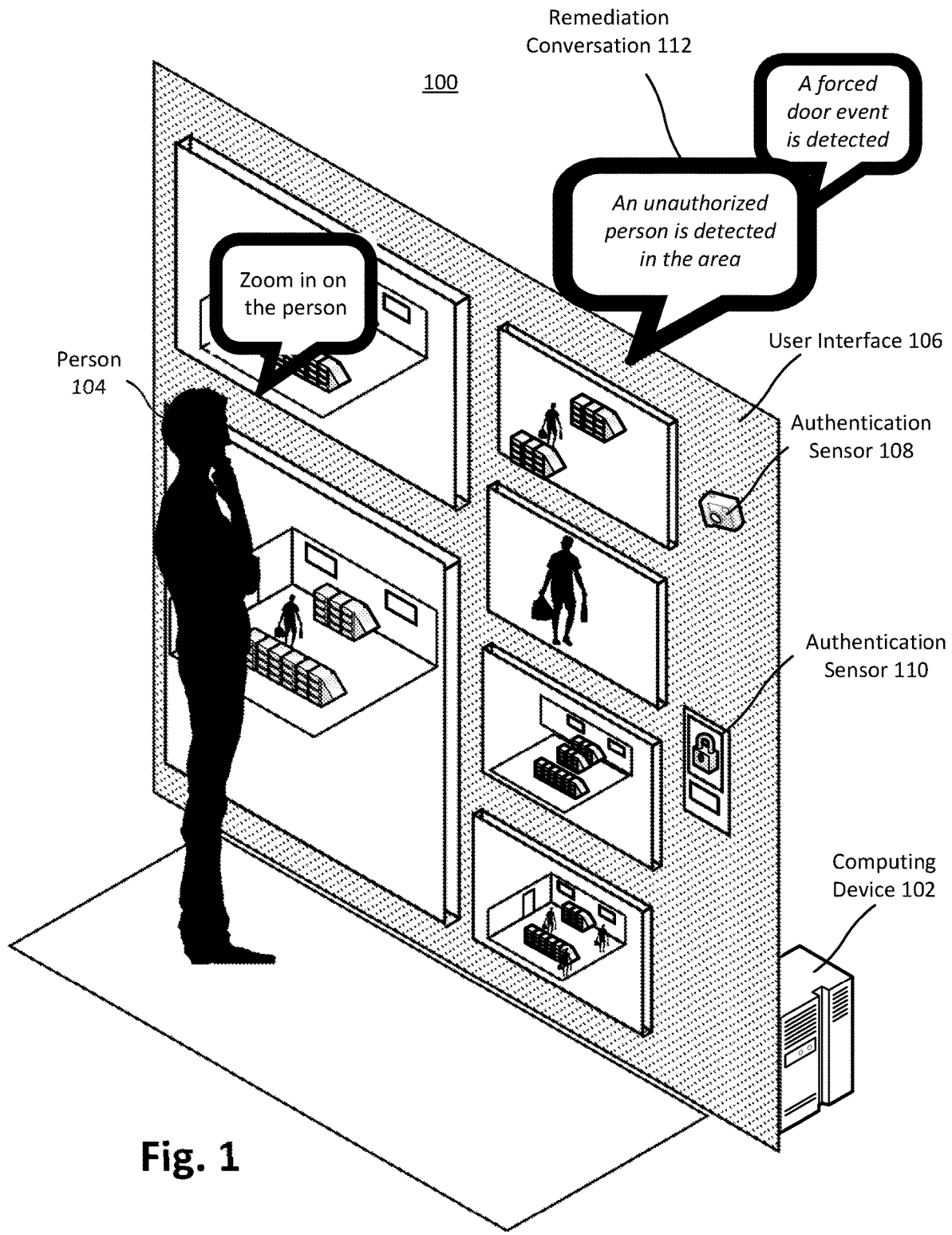
FIG. 1 is a diagram of a scenario for providing personalized and contextualized environment security information, in accordance with exemplary aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The present disclosure includes apparatuses and methods that provide personalized and contextualized security information about an environment. Personalized and contextualized environment security information can improve the way security issues are addressed as security personnel do not have to spend time deducing why an issue exists and have access to information in a manner catered to them. In particular, the present disclosure describes an environment security component (described in FIG. 6 as component 615) that uses natural language processing and natural language understanding to build contextual conversational responses to user requests. In some aspects, the environment security component generates its output in a command center that allows personnel to use different features (e.g., video walls, alert acknowledgement, event analysis, etc.) to handle/resolve security events. In some aspects, the environment security component supports gesture recognition (e.g., via motion tracking of the hand) and facial expression recognition to deliver an autonomous event management system that can detect and contextualize security events using artificial intelligence. The environment security component also solves the challenge of having to manually combine sensor data and identify trends. This removes uncertainty and improves overall reliability and resiliency of the security system. This also speeds up response and understanding through the use of contextual conversations between the security system and the security operator.

As one non-limiting example, consider a security camera located in an office space. While the security camera may be used to detect motion and alert users (e.g., security personnel), the alerts do not necessarily show why the motion is detected. For instance, if a door suddenly opens, prior security systems are unable to describe whether the door opened due to an unauthorized person entering the office or due to a heavy wind—just that the motion of the door opening is detected. In contrast, the apparatus and methods of the present disclosure include an environment security component having one or more machine learning (ML) models configured to gather additional sensor data associated with the alert, and to perform a sensor fusion to filter and/or combine the additional sensor data to provide the security personnel with contextual information that further characterize conditions associated with the alert. For instance, in the above example of an alert based on a door opening, the sensor fusion generated by the environment security component may provide the security personnel with the additional information that no person is detected within a vicinity of the door, and that high winds are detected in the area. As such, the security personnel may be able to quickly deduce that a person has not opened the door, but that instead the door has been blown open by the wind, and thereby the security personnel may reduce a severity level of the alert and/or perform other subsequent security actions different from the actions that would have been taken if a break-in by a person were detected.

Additionally, in another non-limiting example, the environment security component of the apparatus and methods of the present disclosure can identify a particular security personnel operating the system, take into account different user-specific preferences for accessing and/or acting on security information, and conduct a user-specific, natural language processing-based contextual conversational exchange with the identified operator. For example, such user-specific contextual conversation may include using a particular language, presenting security information in a certain order or according to a user-specific arrangement, and/or presenting a user-specific set of options on a user interface to address security issues.

These and other aspects are described in more detail below.

FIG. 1 is a diagram of scenario 100 for providing personalized and contextualized environment security information, in accordance with exemplary aspects of the present disclosure. In scenario 100, person 104 may be a security officer monitoring an environment via user interface 106. User interface 106 may comprise a plurality of monitors, microphones, and/or speakers. In some aspects, user interface 106 comprises one large monitor in a floor-to-ceiling setup. User interface 106 may feature partitions that each depict a different aspect, view, or attribute of the environment. Computing device 102 (described further as computing device 600 in FIG. 6) may be configured to detect security events in the environment (e.g., a door opening) and provide contextual information about the security event (e.g., why the security event occurred) in a remediation conversation 112. Remediation conversation 112 comprises dialogue and/or a presentation of security information (e.g., via user interface 106) and guiding person 104 to resolve the security event. For instance, remediation conversation 112 may include an exchange of audio information, video or photographic or graphical user interface information, touch input, and/or gesture information between the computing device 102 and the person 104. In an exemplary aspect, the contents and style of delivery of remediation conversation 112 is tailored to the preferences of person 104. In order to identify person 104 and retrieve his/her preferences, authentication sensor 108 (e.g., a camera) and/or authentication sensor 110 (e.g., card reader, biometric sensor, etc.) may be used.

Figure 2:
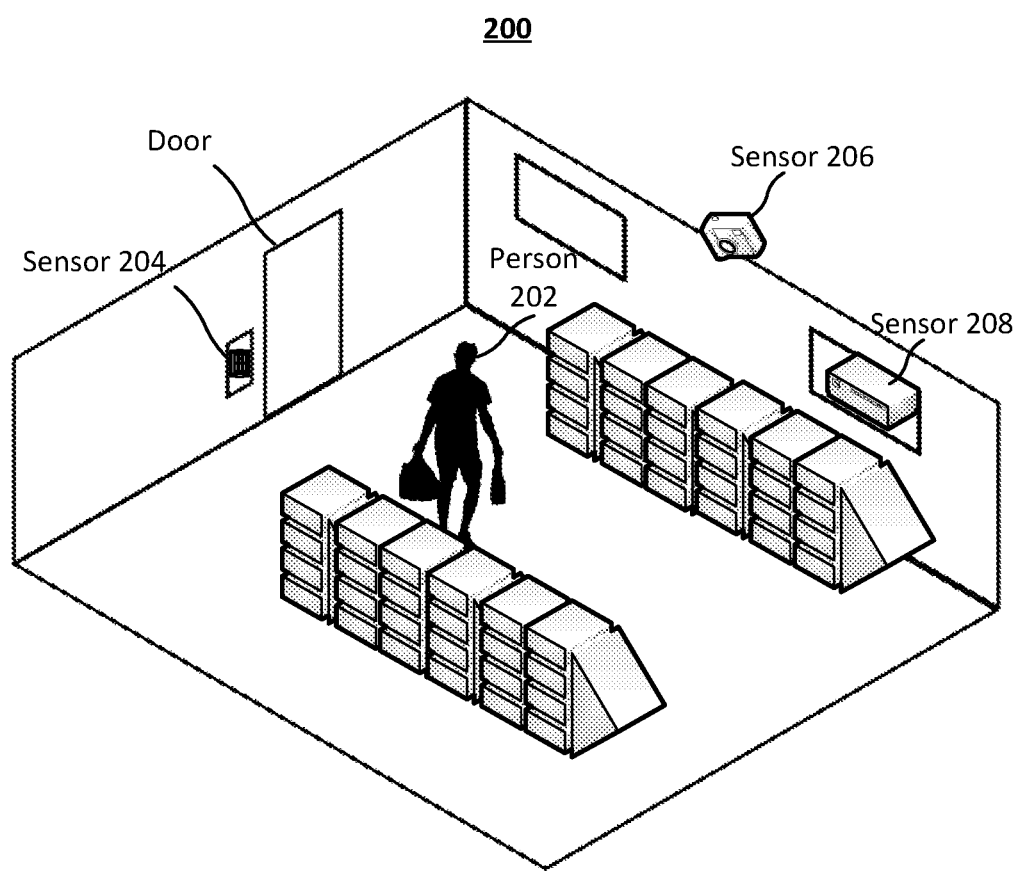
FIG. 2 is a diagram of an environment with a plurality of sensors, in accordance with exemplary aspects of the present disclosure.

FIG. 2 is a diagram of environment 200 with a plurality of sensors, in accordance with exemplary aspects of the present disclosure. In environment 200, person 202 is seen walking around. Disposed within environment 200 are sensor 204 (e.g., card reader), sensor 206 (e.g., security camera), and sensor 208 (e.g., heating/cooling system). Computing device 102 collects a plurality of sensor data from the sensors in environment 200 to detect a security event and provide contextual information about the security event.

In an exemplary aspect, environment security component collects sensor data from physical security devices such as cameras, readers, controllers and additionally gathers wider building related sensor data such as internal temperature, humidity, lighting, water flow, vent status, power supply status, phone system status, fire and/or smoke detection system status, external building conditions (temperature, weather information such as temperature, wind level, rain, etc.) and/or any other sensor information associated with the environment 200 Environment security component fuses the sensor data together for a more certain and reliable security management. With the fused sensor data, trends and statistics are extracted to begin a natural language processing-based and contextual conversation with the security operators of the system. The contextual conversation learns the identity of the operators of the system through configuration, facial recognition, single sign-on and other techniques to understand their native language, preferences and behavior with the security system. This enables the conversation to exhibit a deep understanding of the operator and their preferences.

Figure 3:
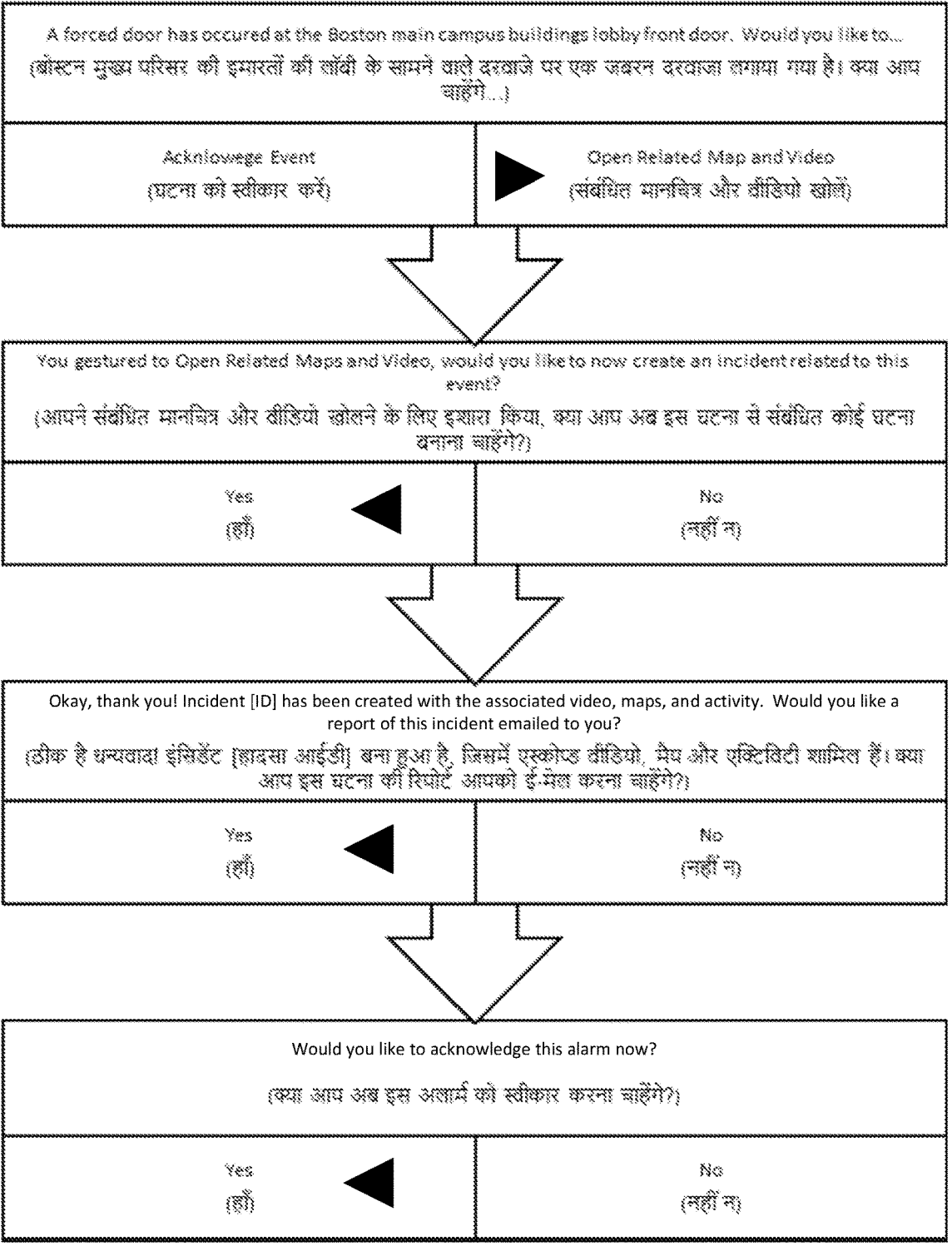
FIG. 3 is an example interaction with the environment security component outputting a remediation conversation, in accordance with exemplary aspects of the present disclosure.

An example of this would be knowing that, for example, the operator's native language is Hindi and thus upon receiving a door alarm, presenting a question to the operator in both English and Hindi to ensure understanding (described in FIG. 3). The contextual conversation is an ongoing dialog between the environment security component and the operator (e.g., person 104). The operator's responses are accepted via various mediums including multi-touch and gestures. Using these response methods, an operator can, for example, gesture by swiping to left and right to switch between events and/or thumbs up for acknowledgement.

FIG. 3 is an example interaction 300 with the environment security component outputting a remediation conversation, in accordance with exemplary aspects of the present disclosure. Interaction 300 depicts different portions of remediation conversation 112, each followed by operator response options. Interaction 300 also indicates the selection of the user (e.g., person 104) and a follow-up portion of the remediation conversation 112. In interaction 300, computing device 102 may determine, from a user profile of person 104, that person 104 prefers the Hindi language when communicating. Accordingly, remediation conversation 112 may include dialogue in Hindi. In some aspects, the remediation conversation 112 is provided visually on user interface 110 and in some aspects, the remediation conversation 112 is presented via audio. Person 104 may provide his/her responses to portions of the remediation conversation 112 via gestures, expressions, physical input, and/or verbal input.

Figure 4:
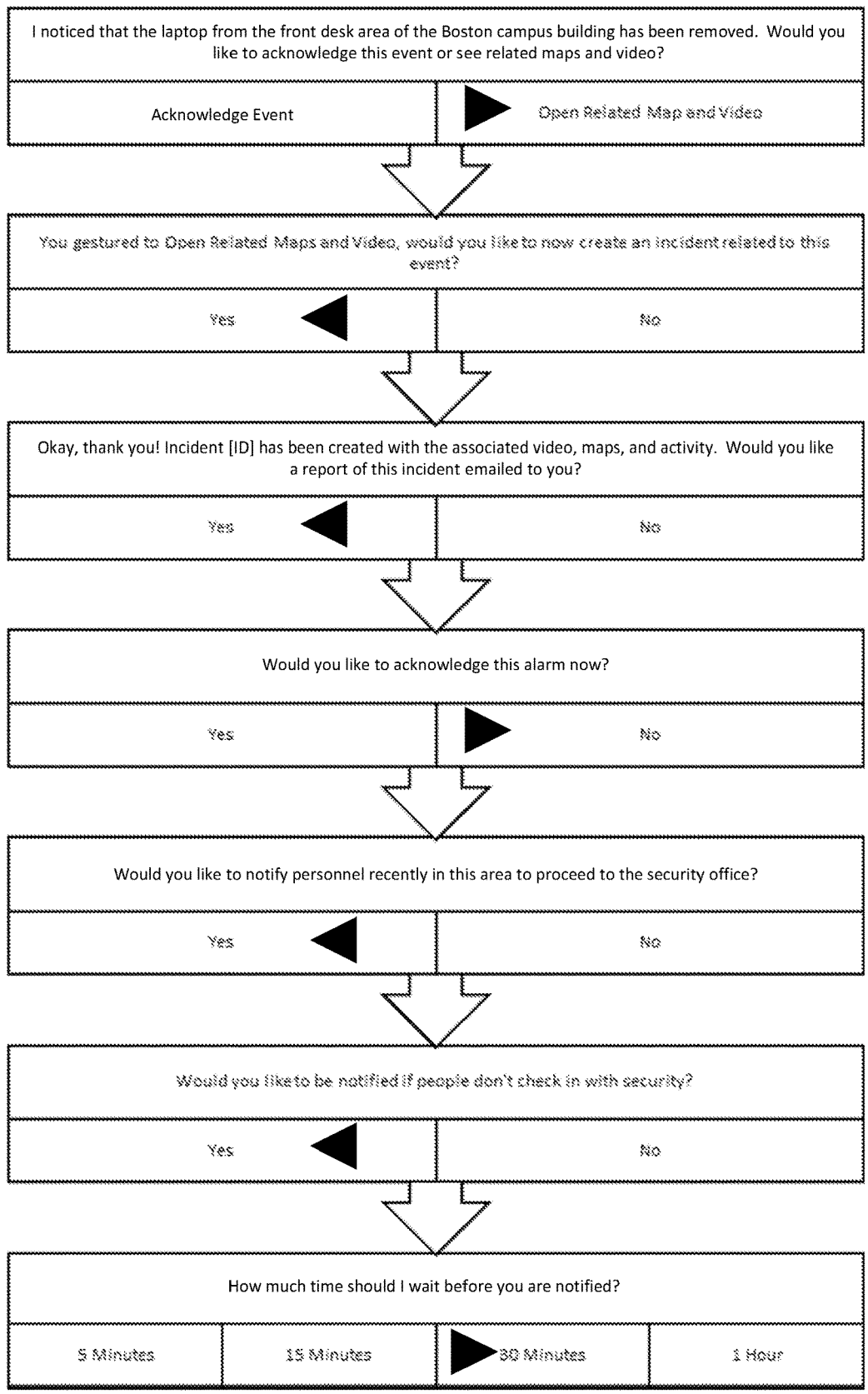
FIG. 4 is another example interaction with the environment security component outputting a remediation conversation, in accordance with exemplary aspects of the present disclosure.

FIG. 4 is another example interaction 400 with the environment security component outputting a remediation conversation, in accordance with exemplary aspects of the present disclosure. Interaction 400 depicts a longer exchange, as compared to interaction 300 (FIG. 3), between person 104 and the environment security component. It should be noted that the remediation conversation 112 is output until person 104 dismisses the conversation or the security event is resolved.

In terms of the capabilities and possibilities associated with generating a remediation conversation, the following is another example interaction:

User: "Find me Gopal who is around 40 years old, dark hair and in the building."
    Response: "He is in South Block in Birch Conference Room."
User: "Message him to come to 'special handling' room."
    Response: "SMS/Email/Teams message will be sent as configured"
    Response Action: Disable Gopal's exit access
    Response Action: Email Security Chief and group of 'event' handlers
User: "Follow him as he walks to 'special handling' room" or "You don't want to miss him, keep an eye as Gopal is walking around."

The following are additional examples of portions of various remediation conversations.

What is my highest priority event?
Would you like to acknowledge this event now?
Would you also like to clear the event?
Would you like an historical report for this event emailed to you?
Would you like to see a map or video related to this event?
Would you like to see the active cause(s) of the event?
Would you like to see the location details of the event?
What is the status of my security system?
Would you like to see when the last backups where completed?
Would you like me to e-mail me a report of system status?
Would you like to set any alerts thresholds for CPU activity?

Would you like to Acknowledge/clear all event on this map?

Would you like to open a video view of all cameras on this map?

Would you like to open any submaps?

Would you like to view trends have been occurring in the past "INSERT TIME FRAME"?

Would you like to disable or put runaway input activity in maintenance mode?

"DOOR NAME" has been in a held state for the past 12 hours, would you like to unsecure the door?

"CAMERA" has been disabled for more than "TIME FRAME", would you like to re-enable it?

Would you like to secure/lockdown "INSERT LOCATION" and escalate any alerts from that location?

Would you like to see social media feeds for this location?

Would you like to send any mass communications messages?

Do you have any personnel or groups you want to be exempt to the lockdown?

Would you like to see where "INSERT PERSON NAME" has been anywhere in the last "INSERT TIME FRAME"

Here is the badge read activities for the "TIME FRAME", would you like to find any video hits based on the person's portrait?

Would you like me to e-mail this report to you?

Would you like to disable this personnel record?

Would you like to disable a credential?

Would you like to flag this person as "Notified"?

Would you like to add this person to a watch list?

Would you like to add these video clips to an incident?

Would you like to remove any of the returned video?

Would you like to see badge reads on the related card readers in sync with the video time frames?

Would you like to provide a comment for the Acknowledgement/Clear?

Would you like me to e-mail you a report of this event?

Would you like this event added to an incident?

Would you like to add the video and event to an incident?

Would you also like to see related maps?

Should I secure an area for you?

Contextual conversations enable focus on increased productivity for daily operational procedures. For example, a daily operational procedure may involve the following steps/actions:

Pull up particular function (example: maps, event viewer, etc.) associated with the alert on video wall and/or monitors.

Search/retrieve recorded video for particular camera(s) along with different types of video analytic(s).

Dispatch notification (screenshot, photo, recorded video) for alerts or alarms to particular groups of staff or other personnel.

Environment security component may generate custom functional calls such as:

Pull up maps for particular area and view surveillance pane on video walls

Search access records for a certain duration of time.

Use particular photo for search Re-identification search.

Generate site emergency protocol which does not allow lower level users to view video in an emergency event.

Contextual conversations enable focus on increased productivity for repetitive programing procedures. An example repetitive programming procedure may involve the following steps/actions:

Allow user to use custom phrases to reuse on different level of alarm programming.

Allow user to quick up look up different types of jobs for the ease of identifying programming error.

Allow user to batch/edit different groups of alerts and alarms.

Allow user to remove single or multiple groups of alerts and alarms.

Allow user to use templates for different scenarios such as adding user profiles and adding different types of analytics or ROI.

In some aspects, system inputs can be received by the environment security component through microphone input (e.g., a single microphones or an array of microphones). In some aspects, cameras can be used for leveraging analytics to pick up gestures as an input. In some aspects, the remediation conversation can be output via a single or multiple surround speakers to provide an immersive experience as well as be output on a screen as textual dialogue. In some aspects, user commands/responses can be delivered remotely (e.g., if the person is walking around the environment such as a campus). In some aspects, environment security component includes a rules engine for taking actions to resolve a security event. The rules engine can be used to narrow the options provided via the remediation conversation.

Figure 5:
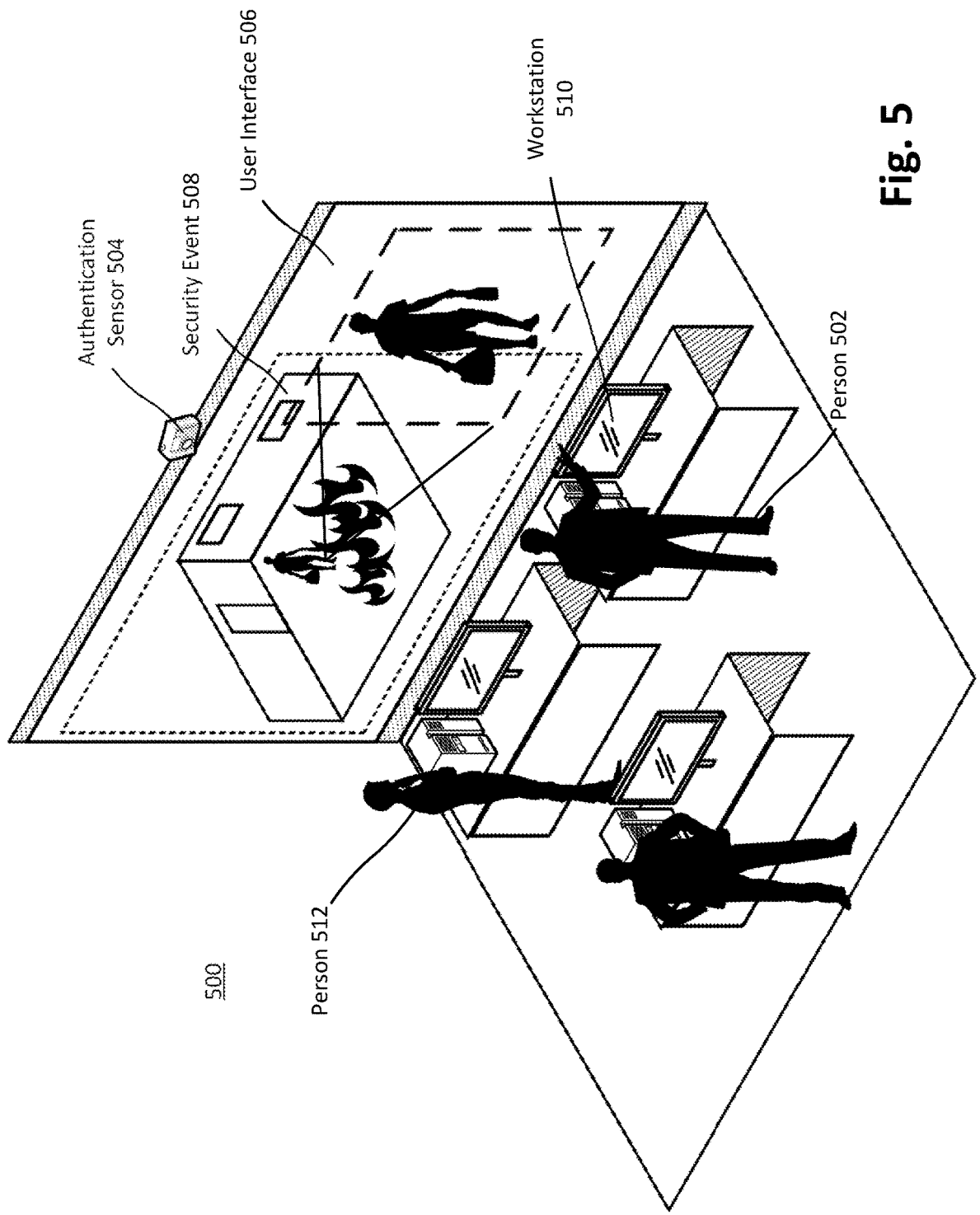
FIG. 5 is a diagram of a scenario for providing personalized and contextualized environment security information in a command center, in accordance with exemplary aspects of the present disclosure.

FIG. 5 is a diagram of scenario 500 for providing personalized and contextualized environment security information in a command center, in accordance with exemplary aspects of the present disclosure. The command center may include a large display where user interface 506 is generated. Persons in the command center (e.g., person 502, person 512) may interact with user interface 506 using verbal commands and gestures. Authentication sensor 504 may receive and parse the commands (e.g., via microphone or camera) and verify whether the person is authorized to interact with user interface 506 (e.g., via facial recognition). In response to determining that the person (e.g., person 502) is authorized to interact with the user interface 506 and provide commands, authentication sensor 504 may accept the command.

In some aspects, the delivery of the contextualized information in the command center may be different depending on the receiving person. For example, a security event may involve detection of a fire caused in a cafeteria. Person 502 may be notified by an alert displayed on user interface 506. Suppose that person 502 prefers alerts to be in the English language. Based on a user profile of person 502, the system may generate the alerts in the English language to accommodate the preference. Suppose that person 512 prefers alerts to be in Hindi. Based on a user profile of person 512, the system may generate the alert of the fire in the Hindi language. Depending on how different the user profiles are, the contextualized information may be quite different for each person. For example, if person 512 is in charge of plumbing, the contextualized information may indicate water line statuses and may further recommend that person 512 should activate the sprinkler system. This option may not be presented to person 502. Likewise, if person 502 is in charge of electrical systems, the contextualized information may indicate electrical wiring statuses and may further recommend shutting off electrical supply to non-essential devices. This information and recommendation may not be available to person 512.

In some aspects, verifying the identity of a person or receiving commands may be performed by sensors in workstation 510 of a person. In some aspects, the workstation 510 may be comprised of tablets, computers, touch screen displays, and other mobile devices. User interface 506 may generate, for display, security events such as security event 508. An example of a command that person 502 may provide to user interface 506 is a gesture that zooms into a person involved in security event 508.

In some aspects, any command center member can virtually join the present members of the task force to remotely accompany each other when handling catastrophic incidents. In some aspects, different command centers may collaborate with each other to handle security events affecting multiple environments.

Persons at the command center depicted in scenario 500 may have real-time access to sensor data in the environment and contextualized environment security information. For example, a security event may be detection of drones near the environment. In response to the detection of drones, the system may generate a security event and allow persons in the command center to dispatch anti-drones. In some aspects, the dispatch may be automated based on a rules engine. For example, the system may send anti-drones to take on the drones entering the perimeter of an environment using RADAR or RoC (i.e., Radar on Chip technology) and in response to detecting the intrusion, trigger cameras on the periphery to display the security event in the command center.

Figure 6:
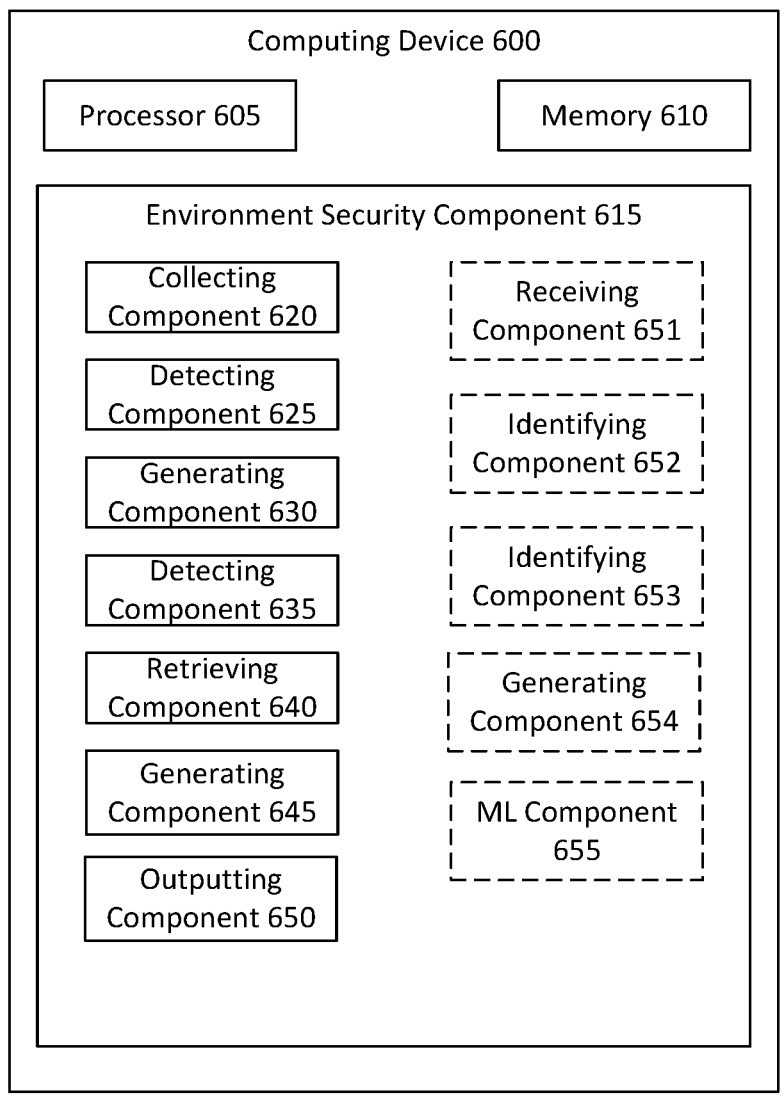
FIG. 6 is a block diagram of a computing device executing an environment security component, in accordance with exemplary aspects of the present disclosure.
Figure 7:
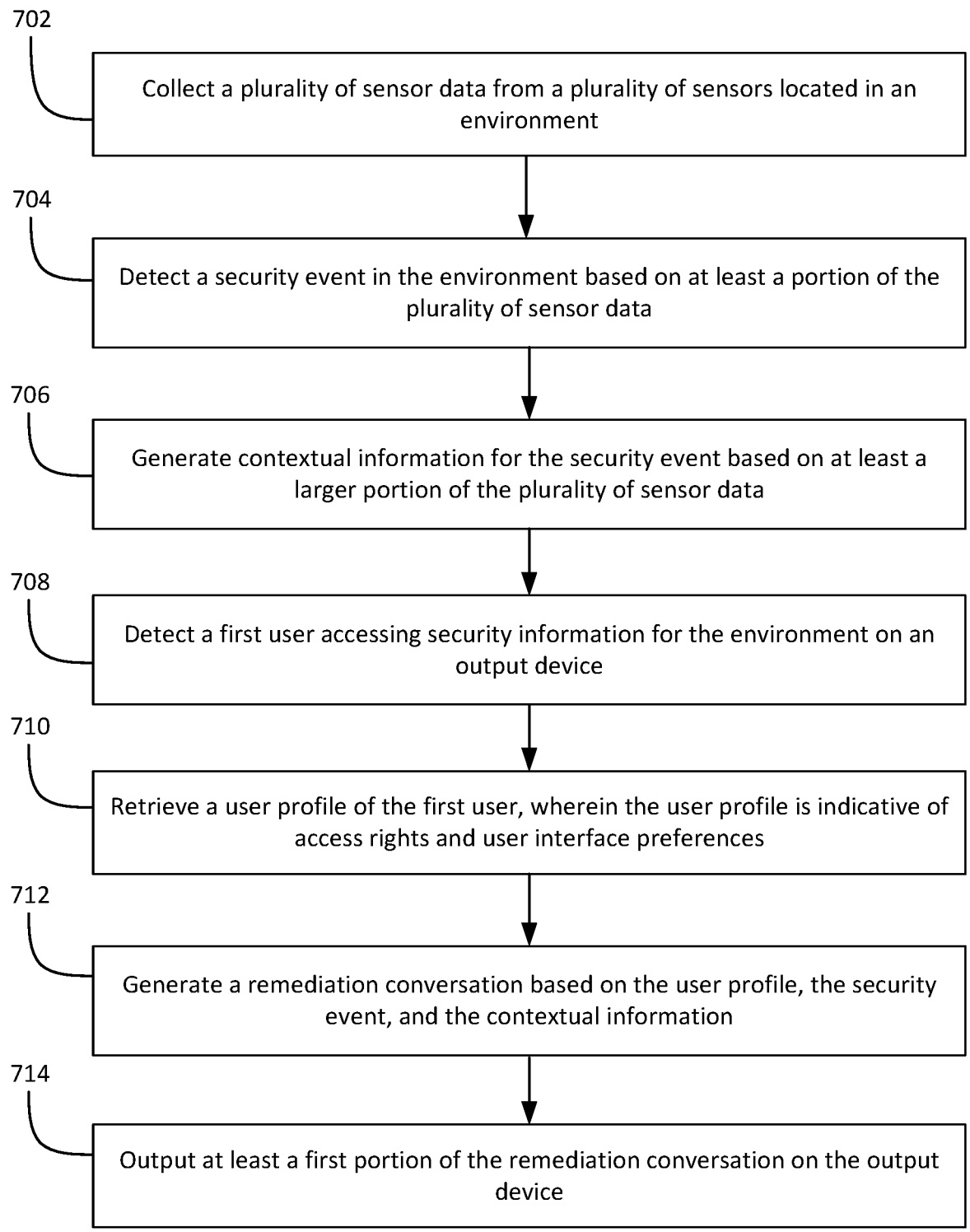
FIG. 7 is a flowchart illustrating a method of providing personalized and contextualized environment security information, in accordance with exemplary aspects of the present disclosure.

FIG. 6 is a block diagram of computing device 600 executing an environment security component, in accordance with exemplary aspects of the present disclosure. FIG. 7 is a flowchart illustrating method 700 of providing personalized and contextualized environment security information, in accordance with exemplary aspects of the present disclosure. It should be noted that a sensor may be any device that can collect data about a physical environment and communicate the data to another device. Sensors may be used for facial detection, mask detection, object recognition, etc.

Referring to FIG. 6 and FIG. 7, in operation, computing device 600 may perform method 700 of providing personalized and contextualized environment security information via execution of environment security component 615 by processor 605 and/or memory 610.

At block 702, the method 700 includes collecting a plurality of sensor data from a plurality of sensors located in an environment. For example, in an aspect, computer device 600, processor 605, memory 610, environment security component 615, and/or collecting component 620 may be configured to or may comprise means for collecting a plurality of sensor data from a plurality of sensors (e.g., sensors 204, 206, 208) located in an environment, as described above in more detail.

At block 704, the method 700 includes detecting a security event in the environment based on at least a portion of the plurality of sensor data. For example, in an aspect, computer device 600, processor 605, memory 610, environment security component 615, and/or detecting component 625 may be configured to or may comprise means for detecting a security event in the environment (e.g., environment 200) based on at least a portion of the plurality of sensor data.

Figure 10:
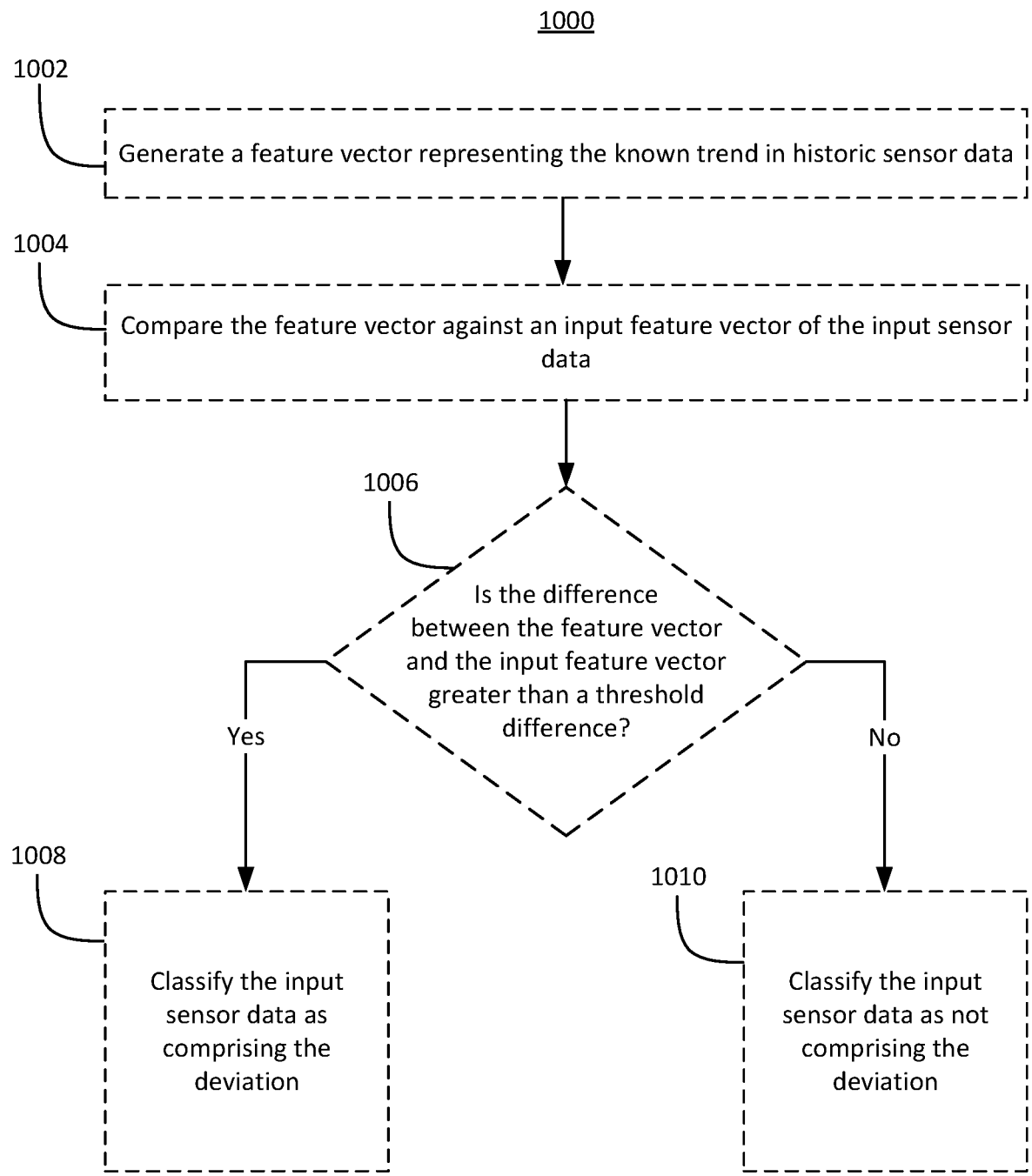
FIG. 10 is a flowchart illustrating a method of training a machine learning algorithm to detect trend deviations, in accordance with exemplary aspects of the present disclosure.

In some aspects, the security event is a deviation from a trend (described in FIG. 10). In some aspects, the security event is indicative of an inconsistency between at least two sensors. For example, collecting component 620 may receive a first sensor output from a first sensor in the environment, and a second sensor output from a second sensor in the environment. Detecting component 625 may then determine based on historical sensor data, that the first sensor should not output the first sensor output when the second sensor outputs the second sensor output. For example, if a card key sensor in the environment did not get a scan of an ID card from an authorized person, a camera should not show that the person is in the room that needs the ID card to be scanned.

In some aspects, the security event represents a summary of monitored activity over a period of time from at least one sensor of the plurality of sensors (e.g., a person count over a period of time).

At block 706, the method 700 includes generating contextual information for the security event based on at least a larger portion of the plurality of sensor data. For example, in an aspect, computer device 600, processor 605, memory 610, environment security component 615, and/or generating component 630 may be configured to or may comprise means for generating contextual information for the security event based on at least a larger portion of the plurality of sensor data.

In some aspects, at least the portion of the plurality of sensor data comprises sensor data from one sensor of the plurality of sensors and wherein at least the larger portion of the plurality of sensor data comprises sensor data from one or more different sensors. In some aspects, the contextual information comprises a cause of the security event. Thus, generating component 630 is configured to generate the contextual information by determining the cause of the security event by comparing at least the larger portion of the plurality of sensor data with activity templates comprising sensor data during historic activities and associated activity identifiers.

In some aspects, the cause of the security event may be determined using a machine learning model (e.g., a classification neural network or machine learning algorithm). The machine learning model may be trained with input vectors comprising activity templates and pre-determined causes. For example, a template may include sensor data showing high temperatures, detected carbon monoxide, and/or a video of a fire. The security event may be a fire alarm that was rang. The contextual information may provide details on the location of the fire and/or what cause the fire. This contextual information is helpful because it prevents persons in the environment from dismissing the alarm as a mere fire drill.

At block 708, the method 700 includes detecting a first user accessing security information for the environment on an output device. For example, in an aspect, computer device 600, processor 605, memory 610, environment security component 615, and/or detecting component 635 may be configured to or may comprise means for detecting person 104 accessing security information for the environment on computing device 102. In some aspects, detecting component 635 may verify the identity of person 104 via authentication sensor 110 and/or authentication sensor 108.

At block 710, the method 700 includes retrieving a user profile of the first user, wherein the user profile is indicative of access rights and user interface preferences. For example, in an aspect, computer device 600, processor 605, memory 610, environment security component 615, and/or retrieving component 640 may be configured to or may comprise means for retrieving a user profile of person 104 from memory 610. In some aspects, the user interface preferences comprises a preferred medium of communication. The medium may be audio, video, and/or physical feedback. The audio preferences may include at least one of: (1) a preferred language, (2) a preferred voice output, (3) a preferred speech speed. The video preferences may include at least one of: (1) an appearance of a user interface where the remediation conversation is generated, and (2) a video quality. The physical feedback preferences may include at least one of: (1) a touchscreen sensitivity of the output device, (2) a vibration strength of the output device, and (3) a haptic feedback sensitivity of the output device.

At block 712, the method 700 includes generating a remediation conversation based on the user profile, the security event, and the contextual information. For example, in an aspect, computer device 600, processor 605, memory 610, environment security component 615, and/or generating component 645 may be configured to or may comprise means for generating remediation conversation 112 based on the user profile, the security event, and the contextual information.

At block 714, the method 700 includes outputting at least a first portion of the remediation conversation on the output device. For example, in an aspect, computer device 600, processor 605, memory 610, environment security component 615, and/or outputting component 650 may be configured to or may comprise means for outputting at least a first portion of the remediation conversation on computing device 102 (e.g., via user interface 106). In some aspects, the remediation conversation comprises options for resolving the security event, wherein different options are provided by the remediation conversation for different contextual information.

Figure 8:
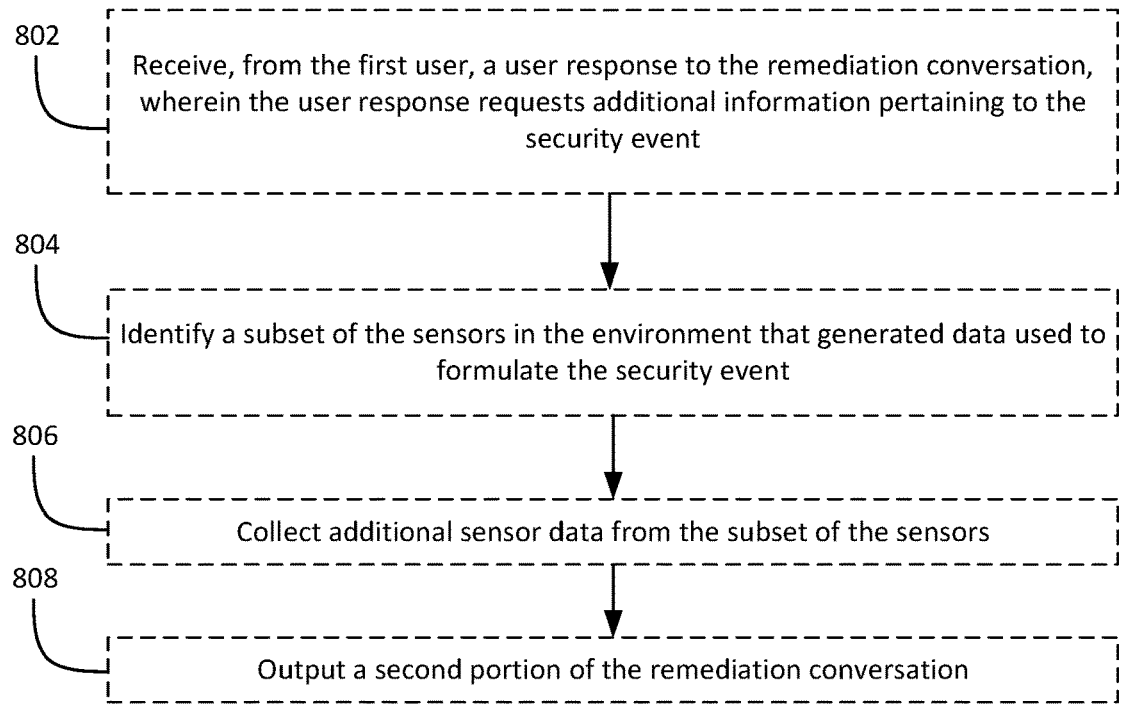
FIG. 8 is a flowchart illustrating a method of conducting a remediation conversation with the user, in accordance with exemplary aspects of the present disclosure.

FIG. 8 is a flowchart illustrating method 800 of conducting a remediation conversation with the user, in accordance with exemplary aspects of the present disclosure. In an aspect, the method 800 may be a continuation of the method 700 (FIG. 7).

At block 802, the method 800 includes receiving, from the first user, a user response to the remediation conversation, wherein the user response requests additional information pertaining to the security event. For example, in an aspect, computer device 600, processor 605, memory 610, environment security component 615, and/or receiving component 651 may be configured to or may comprise means for receiving, from person 104, a user response to the remediation conversation, wherein the user response requests additional information pertaining to the security event. In some aspects, the user response is one of: a verbal response, a gesture, a physical input, and an expression.

At block 804, the method 800 includes identifying a subset of the sensors in the environment that generated data used to formulate the security event. For example, in an aspect, computer device 600, processor 605, memory 610, environment security component 615, and/or identifying component 652 may be configured to or may comprise means for identifying a subset of the sensors (e.g., sensors 206, 208) in environment 200 that generated data used to formulate the security event.

At block 806, the method 800 includes collecting additional sensor data from the subset of the sensors. For example, in an aspect, computer device 600, processor 605, memory 610, environment security component 615, and/or collecting component 620 may be configured to or may comprise means for collecting additional sensor data from the subset of the sensors.

At block 808, the method 800 includes outputting a second portion of the remediation conversation. For example, in an aspect, computer device 600, processor 605, memory 610, environment security component 615, and/or outputting component 650 may be configured to or may comprise means for outputting a second portion of the remediation conversation.

In some aspects, receiving component 651 may receive another user response from the first user and outputting component 650 may output a third portion of the remediation conversation. In this case, portions of the remediation conversation are outputted until the security event is resolved or the first user ceases providing user responses.

It should also be noted that the remediation conversation for the first user is different from a remediation conversation generated for a second user that has at least one of a different access rights and a different user interface preferences.

Figure 9:
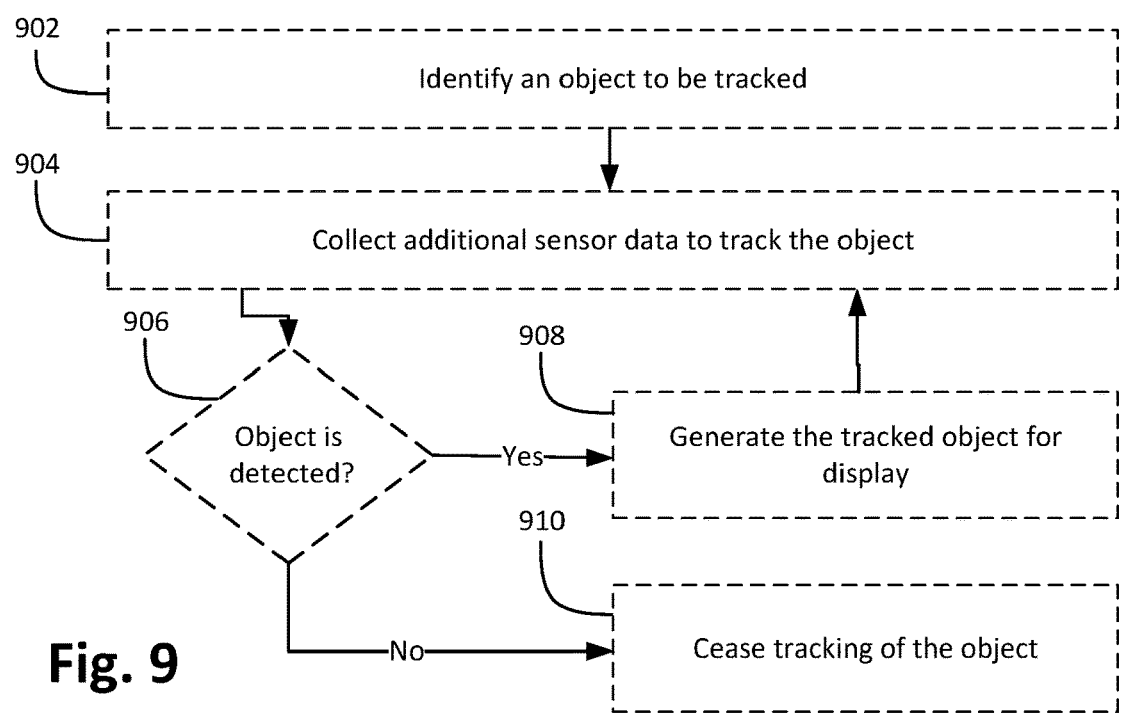
FIG. 9 is a flowchart illustrating a method of object tracking, in accordance with exemplary aspects of the present disclosure.

FIG. 9 is a flowchart illustrating method 900 of object tracking, in accordance with exemplary aspects of the present disclosure. The method 900 may be associated with one or more aspects of the method 700 (FIG. 7), such as with the collection of sensor data (702), the detecting of a security event (704), the generating of contextual information (706), and/or the generation/outputting of the remediation conversation (712/714).

At block 902, the method 900 includes identifying an object to be tracked. For example, in an aspect, computer device 600, processor 605, memory 610, environment security component 615, and/or identifying component 653 may be configured to or may comprise means for identifying an object (e.g., person 202) to be tracked.

At block 904, the method 900 includes collecting additional sensor data to track the object. For example, in an aspect, computer device 600, processor 605, memory 610, environment security component 615, and/or collecting component 620 may be configured to or may comprise means for collecting additional sensor data to track the object.

At block 906, the method 900 includes determining whether the object is detected in the additional sensor data. For example, in an aspect, computer device 600, processor 605, memory 610, environment security component 615, and/or identifying component 653 may be configured to or may comprise means for determining whether person 202 is detected in the additional sensor data (e.g., whether person 202 is in view of the camera). If the object is detected, method 900 advances to block 908. If the object is not detected, method 900 advances to block 910.

At block 908, the method 900 includes generating the tracked object for display. For example, in an aspect, computer device 600, processor 605, memory 610, environment security component 615, and/or generating component 654 may be configured to or may comprise means for generating the tracked object for display (e.g., via user interface 106). From block 908, method 900 returns to block 904, where additional sensor data is collected to track the object.

At block 910, the method 900 includes ceasing tracking of the object. For example, in an aspect, computer device 600, processor 605, memory 610, environment security component 615, and/or identifying component 653 may be configured to or may comprise means for ceasing tracking of person 202.

FIG. 10 is a flowchart illustrating method 1000 of executing a machine learning algorithm to detect trend deviations, in accordance with exemplary aspects of the present disclosure. The method 1000 may be associated with one or more aspects of the method 700 (FIG. 7), such as detecting a security event (704).

At block 1002, the method 1000 includes generating a feature vector representing the known trend in historic sensor data. For example, in an aspect, computer device 600, processor 605, memory 610, environment security component 615, and/or machine learning (ML) component 655 may be configured to or may comprise means for generating a feature vector representing the known trend in historic sensor data.

At block 1004, the method 1000 includes comparing the feature vector against an input feature vector of the input sensor data. For example, in an aspect, computer device 600, processor 605, memory 610, environment security component 615, and/or ML component 655 may be configured to or may comprise means for comparing the feature vector against an input feature vector of the input sensor data (e.g., collected from sensors 205, 206, and/or sensor 208).

At block 1006, the method 1000 includes determining whether the difference between the feature vector and the input feature vector is greater than a threshold difference. For example, in an aspect, computer device 600, processor 605, memory 610, environment security component 615, and/or ML component 655 may be configured to or may comprise means for determining whether the difference between the feature vector and the input feature vector is greater than a threshold difference (e.g., a difference vector). In response to determining that the difference is greater than the threshold difference, method 1000 advances to block 1008. Otherwise, method 1000 advances to block 1010.

At block 1008, the method 1000 includes classifying the input sensor data as comprising the deviation. For example, in an aspect, computer device 600, processor 605, memory 610, environment security component 615, and/or ML component 655 may be configured to or may comprise means for classifying the input sensor data as comprising the deviation.

At block 1010, the method 1000 includes classifying the input sensor data as not comprising the deviation. For example, in an aspect, computer device 600, processor 605, memory 610, environment security component 615, and/or ML component 655 may be configured to or may comprise means for classifying the input sensor data as not comprising the deviation.

While the foregoing disclosure discusses illustrative aspects and/or embodiments, it should be noted that various changes and modifications could be made herein without departing from the scope of the described aspects and/or embodiments as defined by the appended claims. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise.

What is claimed is:

1. An apparatus for providing personalized and contextualized environment security information, comprising:
   a memory;
   a processor coupled with the memory and configured to:
   collect a plurality of sensor data from a plurality of sensors located in an environment;
   detect a security event in the environment based on at least a portion of the plurality of sensor data;
   generate contextual information for the security event based on at least a larger portion of the plurality of sensor data;
   detect a first user accessing security information for the environment on an output device;
   retrieve a user profile of the first user, wherein the user profile is indicative of access rights and user interface preferences;
   generate a remediation conversation based on the user profile, the security event, and the contextual information, wherein the remediation conversation comprises dialogue for providing security information related to the first user and guiding the first user to resolve the security event, wherein another remediation conversation about the security event that is presented to a second user does not include the security information related to the first user; and
   output at least a first portion of the remediation conversation on the output device.

2. The apparatus of claim 1, wherein the processor is further configured to:
   receive, from the first user, a user response to the remediation conversation, wherein the user response requests additional information pertaining to the security event;
   identify a subset of the sensors in the environment that generated data used to formulate the security event;
   collect additional sensor data from the subset or the sensors; and
   output a second portion of the remediation conversation.

3. The apparatus of claim 2, wherein the user response further requests performing object tracking on an object in the environment, wherein the processor is further configured to output another portion of the remediation conversation by:
   identifying the object using the additional sensor data;
   collecting the additional sensor data until the object is no longer detected; and
   generating the tracked object for display.

4. The apparatus of claim 2, wherein the user response is one of: a verbal response, a gesture, a physical input, and an expression.

5. The apparatus of claim 2, wherein the processor is further configured to:
   receive another user response from the first user; and
   output a third portion of the remediation conversation, wherein portions of the remediation conversation are outputted until the security event is resolved or the first user ceases providing user responses.

6. The apparatus of claim 1, wherein the remediation conversation for the first user is different from the another remediation conversation of the second user having at least one of a different access rights and a different user interface preferences.

7. The apparatus of claim 1, wherein at least the portion of the plurality of sensor data comprises sensor data from one sensor of the plurality of sensors and wherein at least the larger portion of the plurality of sensor data comprises sensor data from one or more different sensors.

8. The apparatus of claim 7, wherein the contextual information comprises a cause of the security event, and wherein the processor is further configured to generate the contextual information for the security event based on at least the larger portion of the plurality of sensor data by:
   determining the cause of the security event by comparing at least the larger portion of the plurality of sensor data with activity templates comprising sensor data during historic activities and associated activity identifiers.

9. The apparatus of claim 8, wherein the remediation conversation comprises options for resolving the security event, wherein different options are provided by the remediation conversation for different contextual information.

10. The apparatus of claim 1, wherein the user interface preferences comprises a preferred medium of communication, wherein a medium includes audio, video, and/or physical feedback,
   wherein audio preferences include at least one of:
      a preferred language,
      a preferred voice output,
      a preferred speech speed;
   wherein video preferences include at least one of:
      an appearance of a user interface where the remediation conversation is generated,
      a video quality,
   wherein physical feedback preferences include at least one of:
      a touchscreen sensitivity of the output device,
      a vibration strength of the output device,
      a haptic feedback sensitivity of the output device.

11. The apparatus of claim 1, wherein the security event is indicative of a deviation from a known trend in the environment, wherein the processor is further configured to:
   execute a machine learning algorithm to classify whether input sensor data comprises the deviation by:
      generating a feature vector representing the known trend in historic sensor data;
      comparing the feature vector against an input feature vector of the input sensor data; and
      classifying the input sensor data as comprising the deviation in response to determining, based on the comparison, that a difference between the feature vector and the input feature vector is greater than a threshold difference.

12. The apparatus of claim 1, wherein the security event is indicative of an inconsistency between at least two sensors, wherein the processor is further configured to:
   receive a first sensor output from a first sensor in the environment, and a second sensor output from a second sensor in the environment; and
   determine, based on historical sensor data, that the first sensor should not output the first sensor output when the second sensor outputs the second sensor output.

13. The apparatus of claim 1, wherein the security event represents a summary of monitored activity over a period of time from at least one sensor of the plurality of sensors.

14. A method for providing personalized and contextualized environment security information, comprising:
   collecting a plurality of sensor data from a plurality of sensors located in an environment;
   detecting a security event in the environment based on at least a portion of the plurality of sensor data;
   generating contextual information for the security event based on at least a larger portion of the plurality of sensor data;
   detecting a first user accessing security information for the environment on an output device;
   retrieving a user profile of the first user, wherein the user profile is indicative of access rights and user interface preferences;
   generating a remediation conversation based on the user profile, the security event, and the contextual information, wherein the remediation conversation comprises dialogue for providing security information related to the first user and guiding the first user to resolve the security event, wherein another remediation conversation about the security event that is presented to a second user does not include the security information related to the first user; and
   outputting at least a first portion of the remediation conversation on the output device.

15. The method of claim 14, further comprising:
   receiving, from the first user, a user response to the remediation conversation, wherein the user response requests additional information pertaining to the security event;
   identifying a subset of the sensors in the environment that generated data used to formulate the security event;
   collecting additional sensor data from the subset of the sensors; and
   outputting a second portion of the remediation conversation.

16. The method of claim 15, wherein the user response further requests performing object tracking on an object in the environment, wherein outputting another portion of the remediation conversation further comprises:
   identifying the object using the additional sensor data;
   collecting the additional sensor data until the object is no longer detected; and
   generating the tracked object for display.

17. The method of claim 15, wherein the user response is one of: a verbal response, a gesture, a physical input, and an expression.

18. The method of claim 15, further comprising:
   receiving another user response from the first user; and
   outputting a third portion of the remediation conversation, wherein portions of the remediation conversation are outputted until the security event is resolved or the first user ceases providing user responses.

19. The method of claim 14, wherein the remediation conversation for the first user is different from the another remediation conversation of the second user having at least one of a different access rights and a different user interface preferences.

20. A non-transitory computer-readable medium storing instructions, executable by a processor, for performing a method for providing personalized and contextualized environment security information, comprising:
   collecting a plurality of sensor data from a plurality of sensors located in an environment;
   detecting a security event in the environment based on at least a portion of the plurality of sensor data;
   generating contextual information for the security event based on at least a larger portion of the plurality of sensor data;
   detecting a first user accessing security information for the environment on an output device;
   retrieving a user profile of the first user, wherein the user profile is indicative of access rights and user interface preferences;
   generating a remediation conversation based on the user profile, the security event, and the contextual information, wherein the remediation conversation comprises dialogue for providing security information related to the first user and guiding the first user to resolve the security event, wherein another remediation conversation about the security event that is presented to a second user does not include the security information related to the first user; and
   outputting at least a first portion of the remediation conversation on the output device.

* * * * *